Patented Dec. 20, 1949

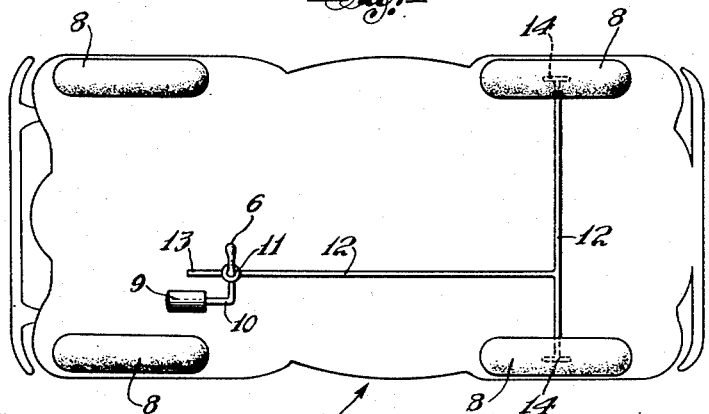
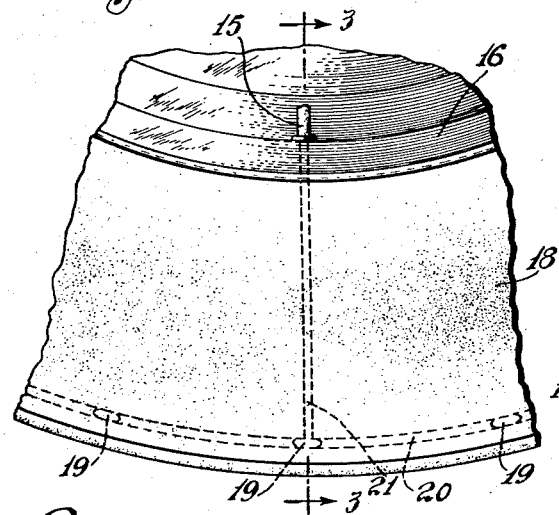
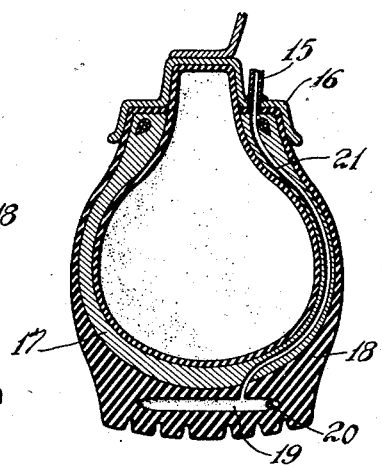
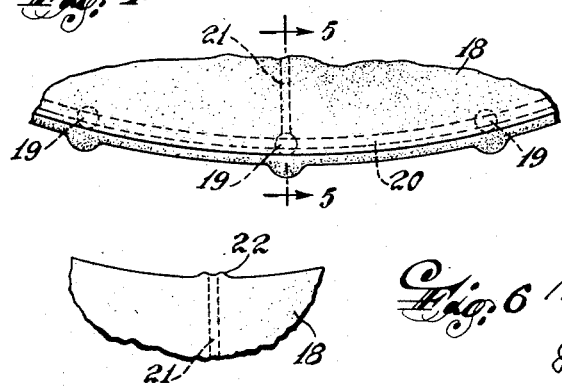
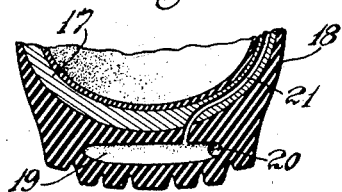

2,491,491

UNITED STATES PATENT OFFICE 2,491,491

PNEUMATIC TIRE AND ANTISKID MEANS THEREFOR

Walter H. Freygang, Essex Fells, N. J., assignor to Kidde Manufacturing Co., Inc., Bloomfield, N. J., a corporation of Delaware Application March 26, 1947, Serial No. 737,213

7 Claims. (Cl. 152—331)

This invention relates to a vehicle tire such as an automobile or truck tire and particularly to a pneumatic tire which is provided with inflatable means for causing the tread section thereof to assume a configuration adapted to increase the traction between the tire and the roadway, and means for inflating the inflatable means.

Many attempts have been made in the past to increase the traction of an automobile tire. Tires have been provided with a tread design or chains, and similar devices have been placed about the tire in order to increase the traction between the tire and the roadway, particularly when the latter is coated with snow or ice. It has been found that tread designs placed on the tire tend to cause vibration during operation of the automobile if such designs are large enough to increase traction sufficiently when the vehicle is operated on ice or snow. An example of such tread designs is the so-called "snow tread" which is widely used by farmers and other individuals who must continually operate a vehicle on muddy roads or roads where snow and ice are not removed.

Tire chains, either metallic or formed of fabric and rubber, increase traction of the vehicle tire sufficiently for operation over snowy or icy surfaces. However, chains inevitably cause a great deal of vibration in the operation of the vehicle over a smooth, hard paving surface, are quickly worn out, and cause more rapid than normal wear on both the tire and the pavement. For this reason, many municipalities have forbidden the operation of a vehicle on a dry pavement with chains on the tires.

It has been found that most of the difficulty in driving within an urban area is on short stretches of pavement such as within private driveways, parking lots, or drawing away from a curb at the side of the street where snow and ice tends to collect. Inasmuch as well traveled streets are usually cleared of snow and the vehicles traveling over such streets tend to melt snow and ice, the requirement of additional traction is only temporary.

Accordingly, an object of this invention is to provide equipment for increasing the traction of a vehicle tire when desired and subsequently restoring the tire to its normal condition.

Another object is to provide such equipment wherein the operator of the vehicle can increase the traction of the tire on the roadway without moving from the operator's compartment.

Another object is to provide a tire in which the shape of the tread portion can be altered at will by the vehicle operator in order to increase the traction thereof.

Another object is to provide a pneumatic tire in which the traction may be increased without partially deflating the tire.

A further object is to provide equipment of the above indicated character which is simple and durable in construction, economical to manufacture and effective in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing forming part of the operation wherein:

Figure 1 is a schematic view illustrating a vehicle provided with equipment in accordance with the invention.

Figure 2 is an enlarged fragmentary elevational view of a tire in accordance with the invention.

Figure 3 is a sectional view taken along the line 3—3 of Figure 2.

Figure 4 is a fragmentary elevational view of the tire with the tread deformed.

Figure 5 is a sectional view taken along the line 5—5 of Figure 4.

Figure 6 is a fragmentary elevation of the terminus of the passage within the tire, used to deform the tread.

Referring to Figure 1, there is shown a vehicle 7 of the type having wheels covered with inflatable tires 8. The vehicle is provided with a source of fluid pressure media such as a tank 9 of compressed air or other compressed gas. In lieu of the tank 9, compressed air may be supplied by pump means driven by the engine used to power the vehicle.

A passage 10 leads from the tank 9 to a three-way valve 11, having an operating handle 6 accessible to the operator of the vehicle from the driving compartment. The valve 11 is of conventional construction and serves to selectively connect the passage 12 leading therefrom to either a vent 13 exposed to the atmosphere or to the passage 10 containing the compressed fluid.

The passage 12 leads to each of the rear wheels where a packed joint of any conventional construction 14, communicates the passage 12 with passages 15 on each of the rear wheels leading from the center thereof to the tire engaging rim section 16 of the wheels. The passage 15 extends through the base of rim section 16, as shown in Figure 3.

The tires for the rear wheels are a specially constructed pneumatic type comprising a fabric "carcass" 17 covered with a resilient layer of rubber or similar material 18, and traction increasing means about to be described.

Within the tread section of these tires, a plurality of pockets 19 are formed which consist of hollow portions within the resilient layer of the tire. The pockets 19 are preferably spaced equally around the periphery of the tire and transverse the tread, as shown in Figures 2 and 3. The pockets 19 may, if desired, be reinforced by a fabric lining in general similar to that used in the tire, in order to limit expansion of the pocket as hereinafter described.

Connecting the series of pockets 19 and within the wall of the tire, is provided a passage 20 which preferably runs completely around the tire. From one of the pockets 19, or, if preferred, from the passage 20, a second passage 21 within the tire wall leads to the bead of the tire. This passage terminates in a slightly raised crater 22 on the rim engaging portion of the bead, as shown in Figures 3 and 6.

In assembling the tire herein described to the wheel, the passage 15 of the rim is aligned with the passage 21 of the tire, to form a continuous passage leading from the valve 11 to the pockets 19 located within the tire.

The tire described herein may have a conventional tread, as used in automobile tires, which, when the pockets 19 are not inflated, will be quiet and smooth in operation and free from vibration upon operation of the vehicle.

At the will of the operator the valve 11 may be opened to release compressed fluid from passage 10 through passage 12 and by means of the packed joint 14 and the passage 15 to the passages within the tire and the pockets 19 adjacent the tread surface thereof. The pockets 19 will then be expanded as generally indicated in Figures 4 and 5. Inasmuch as these pockets are outside the fabric "tire carcass," the surface of the tread will be deformed and the traction of the tire on the roadway thereby increased. The pressure proposed for this operation is about sixty pounds per square inch or less, although a higher pressure could be used if the pockets and passages within the tire are reinforced in some manner.

When the pockets are inflated, as illustrated in Figures 4 and 5, they will cause a certain amount of vibration when the tire is operated on a smooth pavement free from ice and snow. However, upon reaching a pavement where the additional traction of the special tire is not required, the operator of the vehicle may operate the valve 11 in order to close the supply of fluid pressure from tank 9 and vent the pockets 19 to the atmosphere by means of the passages 20 and 21 within the tire wall and the passages 12 and 15.

Inasmuch as most vehicles are propelled by the rear wheels only, it is proposed to utilize this tire only on the driving wheels. However, such a tire may be provided on other than driving wheels, if desired.

It will be seen from the foregoing description that the present invention provides improved equipment for selectively increasing the traction of vehicle tires. A particular advantage of the equipment described is that the traction may be increased from the driver's compartment rapidly and easily and with a minimum of effort on the part of the driver. Likewise, the tires may be restored to normal configuration by the driver, as quickly and effortlessly, without leaving the driving compartment of the vehicle.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described and all statements of the scope of the invention which as a matter of language might be said to fall therebetween.

I claim:

1. A tire for vehicle use comprising a tire body having a resilient tread portion, a plurality of inflatable pockets in said tread portion spaced about the periphery of said tread portion for deforming said tread portion at intervals and a conduit interconnecting said inflatable pockets.

2. A tire comprising a tire body having a resilient tread portion and a plurality of inflatable pockets in said tread portion for deforming said resilient tread portion at intervals about the periphery thereof.

3. A tire comprising a tire body having a resilient tread portion, a plurality of inflatable pockets in said tread portion for deforming said resilient tread portion at intervals about the periphery thereof, and means for inflating said pockets.

4. A tire for vehicle use comprising a tire body having a resilient tread portion, a plurality of pockets in said tread portion spaced about the periphery thereof for deforming said tread portion at intervals, and a conduit interconnecting said pockets, said conduit terminating adjacent the rim engaging portion of said tire.

5. A tire for vehicle use comprising a tire body having a resilient tread portion, a plurality of elongated transverse pockets in said tread portion spaced about the periphery thereof for deforming said tread portion at intervals, and a conduit interconnecting said pockets, said conduit terminating adjacent the rim engaging portion of said tire.

6. A tire for vehicle use comprising a pneumatic type tire having a fabric body and a resilient tread portion, a plurality of inflatable pockets in said tread portion spaced about the periphery of said tread portion for deforming said tread portion at intervals, a passage within said tire interconnecting said pockets, and a second passage extending from said first passage to the rim engaging portion of said tire.

7. A tire for vehicle use comprising a pneumatic type tire having a fabric body and a resilient tread portion, a plurality of inflatable transverse pockets in said tread portion spaced about the periphery of said tread portion for deforming said tread portion at intervals, an annular passage within said tire interconnecting said pockets, a second passage extending from said first passage to the rim engaging portion of said tire and connecting means at said rim engaging portion for said second passage.

WALTER H. FREYGANG.

REFERENCES CITED

The following references are of record in the file of this patent:

UNITED STATES PATENTS

| Number | Name | Date |
|---|---|---|
| 1,443,258 | Granat | Jan. 23, 1923 |
| 2,158,690 | Uksila | Aug. 8, 1939 |
| 2,356,508 | Couturier | Aug. 22, 1944 |